United States Patent [19]

Saccoccio

[11] Patent Number: 4,987,761
[45] Date of Patent: Jan. 29, 1991

[54] METHOD OF FORMING A DEVICE INCLUDING AN INTEGRALLY FORMED NUT

[76] Inventor: August J. Saccoccio, 996B Pontiac Ave., Cranston, R.I. 02920

[21] Appl. No.: 217,538

[22] Filed: Jul. 11, 1988

[51] Int. Cl.⁵ .................. B21D 28/00; B21D 53/20; F16B 37/16
[52] U.S. Cl. .................. 72/335; 411/437; 10/86 F; 220/3.2
[58] Field of Search .............. 10/86 F; 411/366, 436, 411/437; 174/53; 220/3.2, 3.3, 3.7, 3.8; 72/379, 335

[56] References Cited

U.S. PATENT DOCUMENTS

| | | | |
|---|---|---|---|
| 2,231,976 | 2/1941 | Von Holtz | 174/53 |
| 2,367,659 | 1/1945 | Burke | 411/436 |
| 2,832,972 | 5/1958 | Richards | 10/86 F |
| 3,255,658 | 6/1966 | Gargrave | 411/366 X |
| 3,259,404 | 7/1966 | Papenguth | 411/531 X |
| 3,373,645 | 3/1968 | Holton | 411/437 |
| 3,491,646 | 1/1970 | Tinnerman | 411/437 X |
| 3,711,931 | 1/1973 | Ladouceur et al. | 10/86 F X |
| 3,775,790 | 12/1973 | Tinnerman | 10/86 F |
| 3,967,049 | 6/1976 | Brandt | 174/53 |
| 3,996,834 | 12/1976 | Reynolds | 10/86 F |
| 4,025,144 | 5/1977 | Thibeault | 174/53 X |
| 4,214,667 | 7/1980 | Lass | 220/3.2 |
| 4,347,636 | 9/1982 | Capuano | 10/86 F |
| 4,403,708 | 9/1983 | Smolik | 220/3.3 X |
| 4,438,859 | 3/1984 | Solek | 220/3.3 X |
| 4,756,168 | 7/1988 | Saccoccio | 411/437 X |

FOREIGN PATENT DOCUMENTS

| | | | |
|---|---|---|---|
| 601928 | 7/1978 | Switzerland | 220/3.2 |
| 30142 | 12/1910 | United Kingdom | 411/290 |
| 2168206 | 6/1986 | United Kingdom | 220/3.2 |

Primary Examiner—Neill R. Wilson
Attorney, Agent, or Firm—Robert J. Doherty

[57] ABSTRACT

A simplified nut having a substitute "thread" in the form of an edged flat which can receive a threaded member. The flat or flats are swedged from material preferably in sheet form surrounding a smooth bore opening in which the flat(s) entirely extend. The edges of the flat(s) may be circular or helical, continuous or discontinuous. The device and its forming method eliminates separate handling and cleanup associated with conventional thread forming methods.

2 Claims, 1 Drawing Sheet

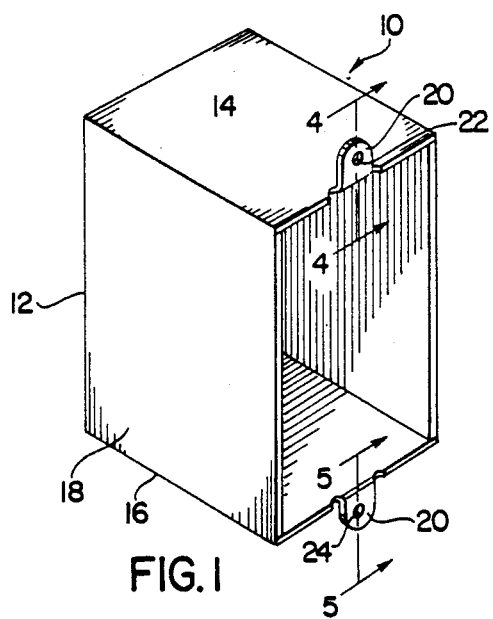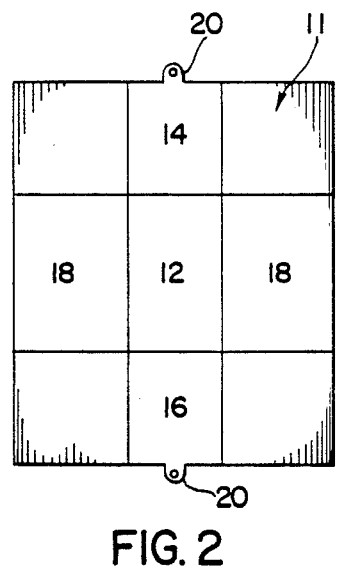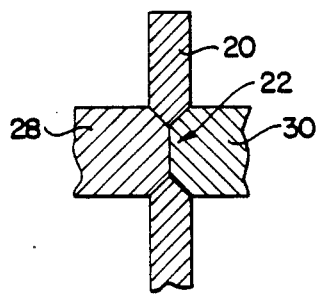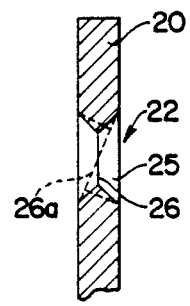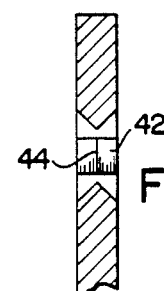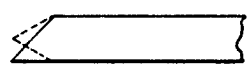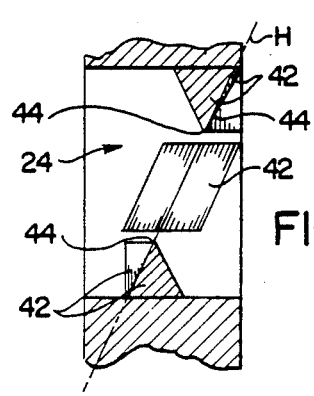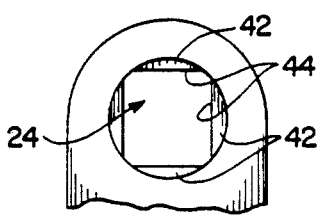

METHOD OF FORMING A DEVICE INCLUDING AN INTEGRALLY FORMED NUT

BACKGROUND AND SUMMARY OF THE INVENTION

This application is related to U.S. patent application Ser. No. 904,460 filed Sept. 8, 1986 and entitled IMPROVED EARRING CONSTRUCTION and now U. S. Pat. No. 4,756,168 issued Jul. 12, 1988 and U.S. patent application Ser. No. 189,299 filed May 2, 1988 which in turn is a division of said aforementioned application.

This invention relates to a simplified nut construction and the method of forming such. The term nut as hereinafter used means not only devices which receive a threaded member, but any device, article, etc. which is provided with an opening adapted to receive a threaded member in the manner of the present invention.

Providing conventional threads in a nut is costly, time consuming and requires specialized tooling. In addition and especially when the nut is part of a larger article, i.e., the nut is a threaded opening in an article such as an electrical wiring box, the necessity of brushing or otherwise removing both the chips, etc. formed from the cutting process and oil or other cutting fluids utilized is bothersome and costly as well. Forming threads by cutting also involves a separate operation requiring additional handling of the article. It would thus be desirable to be able to form a nut without incurring metal chips, dust, etc. or utilizing cutting fluids that require a cleaning step and to be able to form such a nut construction without requiring further article handling other than those necessitated by its overall character.

Accordingly, an object of the present invention is to provide a nut within an overall article and its formation method that does not require added handling steps in its formation.

Another object of the invention is to provide a nut either separately or within an overall article and its method of formation that does not require the normal cleanup procedures associated with metal cutting.

These and other objects of the present invention are accomplished by a nut having a generally flat body with a circular smooth bore opening extending therethrough, said opening having at least one flat chordally extending across the inner periphery of said opening and entirely within the thickness of said opening, said flat having a generally V-shaped running edge, said edge forming a tooth for engagement with the threads of a screw adapted to be received in said opening, said edge extending up to but not exceeding one complete revolution with said opening.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a perspective view of an electrical outlet box;

FIG. 2 is a plan view of a blank from which such box could be made,

FIG. 3 is a sectional view of an opening showing the position of forming tools therein;

FIG. 4 is a sectional view along line 4—4 of FIG. 1;

FIG. 5 is a sectional view along line 5—5 of FIG. 1;

FIG. 6 is a front view on an enlarged scale of opening 24;

FIG. 7a is a schematic sectional view of a step in the forming process of the edge shown in FIG. 5;

FIG. 7b is a view similar to FIG. 7a showing the edge reshaped; and

FIG. 8 is a sectional view of the opening 24 showing a modified form of the invention from FIG. 5.

DETAILED DESCRIPTION OF THE INVENTION

Turning now to the drawing, the invention will be described by reference to an electrical outlet box 10 shown in FIG. 1, although it should be clear that such article is by way of illustration only, and that the invention could be utilized with other articles, devices, etc. as well including a conventionally-appearing nut if such includes a workable sheet metal portion as will be apparent as this explanation of the invention continues. The electrical box 10 is of conventional design including a base 12, top and bottom walls 14 and 16 respectively, and connecting side walls 18. The top and bottom walls are provided with tabs 20 each of which is in turn provided with a circular opening. The top tab opening is designated 22 and represents one form of the invention while the bottom tab opening is designated 24 and represents another form of the invention.

It should be pointed out that the box 10 is formed from a blank 11 of suitable and generally metal sheet stock then appropriately cut, scored and bent to form the overall shape shown in FIG. 1. As above indicated, this invention usually contemplates the working of metal sheet, e.g., brass, steel, etc.; however, other materials which can be swedged or work reshaped by punches, dies, etc. such as resin plastics, e.g., PVC, polyethylene, etc., are also contemplated. Normally if the box 10 tab openings were to be conventionally provided with a screw thread or threads such would take place after formation of the box as a separate operation; or if done while in blank form, the blank would be transferred from the press in which the cutting and blanking operations take place to another holding device and in either case requiring further handling and cleaning to remove chips or dust and possibly cutting fluid. The present invention eliminates these further handling and cleaning operations by providing a structure which acts as a thread in the openings 22 and 24 by material forming operations which take place on the blank 11 while it is held in the press for blanking and scoring.

Referring to FIGS. 3 and 4, it will be apparent that a thread substitute or flat 25 having a generally V-shaped running edge 26 is formed in the interior of the opening 22 by a pair of opposed metal working punches 28 and 30. Thus after the opening 22 has been formed by a conventional cutting punch, the blank moves to another progressive station where the punches 28, 30 of a slightly larger diameter than the hole 22 co-act to form the edge 26 by, in essence, wiping or reshaping portions of the blank sheet adjacent the hole 22 into the configuration shown, that is, a continuous generally V-shaped running edge 26 disposed within the lateral confines of the opening 22. This flat or flats is adapted to engage a standard screw thread, i.e., a bolt (not shown), adapted to thread into the tab opening 22 to attach a standard electrical outlet therein. The punches can accomplish this swedging action in one or more steps, that is, the punches can come together to accomplish the work once, twice, or more, i.e., progressive, steps. Of course, only a maximum of one turn can be provided on the running edge 26 and in some instances even less than one turn would be required for effective screw thread contact.

In addition and as shown by the dotted line representation in FIG. 4, a modified running edge 26a may be formed in the shape of a helix turn or portion thereof simply by modifying the contact faces of the punches 28, 30 to such complementary shapes, that is, mating portions each of which is a helix portion.

Turning now to FIGS. 5 through 8, another form of a running V-shaped edge or edges 44 is shown. In such, the opening 24 is provided with one or more flats 42. In FIG. 6, four such flats 42 which, in effect, progress around the inner periphery of the opening 24 are shown. Each flat chordally extends across a portion of the opening 24 either parallel to the plane of the blank 11 when a circular running edge 44 similar to running edge 26 of FIG. 4 is desired or slightly inwardly canted to compositely form a complete or partial helical turn similar to running edge 26a (such composite turn would be partially disconnected as it would be interrupted at the adjacent edges of the several flats 42). The circular form is shown in FIGS. 5, 7a, and 7b while the canted or helical form is shown in FIG. 8. The flats after reshaping include the desired V-shape with a pointed edge 44.

To form the edges 44 shown in FIG. 5, the flat portions 42 of the blank 11 are swedged in a progressive die operation such that the normally straight cut edge of the flats are reformed into a wedge-shaped angle as shown by the solid lines in FIG. 7a. The flats 42 may be formed in a previous punching or dapping operation such as that described in U.S. Pat. No. 4,756,168, the disclosure of which is herein incorporated into this application by specific reference thereto. Thereafter, at a progressive station in the tooling, the pointed edges 44 are then rebent or dapped to position the point of the edge to the dotted line position shown in FIG. 7a or to the position shown in solid lines in FIG. 7b. This edge 44 is centered approximately midway in the thickness forming the blank 11 and is the final intended position of the structure. Such rebending or dapping takes place from the opposite side of the blank from which the original swedge was applied. The box 10 form is then cut from the remainder of the blank 11 and reshaped into the final form shown in FIG. 1.

When the interrupted helical form running edge 44 shown in FIG. 8 is to be formed, a similar procedure to that above described is utilized except the shape of the dies forming the flats 42 and then reshaping or dapping such are modified not only in shape to reflect the inward slant of the edge 44 but also the extent to which the tooling extends into the opening 24. Also since the full thickness of the blank is not being worked, a backup punch or tool is preferably used in addition to the forming die or dapping tool. In forming such flats, the utilization of multiple tools operating at different levels of extent into the opening 24 may be useful; however as with this and the other embodiments of the invention, single and/or multiple tools are contemplated. It may thus be seen that the individual edges 44 of the FIG. 8 embodiment generally are aligned along a helical path as illustrated by the dotted line H.

Accordingly, it may be seen that an inexpensively produced opening is produced which acts as a threaded nut for receipt of the bolt and provides a smooth and strip-free contact operation. Also, such openings, or rather the thread-like edges formed therein, are provided without a threading operation which would produce metal chips or filings and oil or fluid splattering which would require not only transfer from the standard progressive tooling in which it is shaped by this invention but also a separate cleaning operation. Generally it is preferable to shape the running edge 26a or 44 of the flat to correspond with the threaded member for which it is intended, that is, if a standard 60 degree thread is utilized, then the included angle of the flat as shown in FIG. 7b would also be 60 degrees. That would correspond with a downward swedge of the 60 degrees of the flat as shown in FIG. 7a and then an upward dapping or reforming of about 30 degrees to provide the final configuration shown in the dotted lines of FIG. 7a and in the solid lines in FIG. 7b.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims. Particularly, it should be apparent that although the present invention has particular utility and advantages in connection with the formation of devices, objects, etc. having openings with thread substitutes therein from a blank of metal or other sheet which is progressively formed, the invention could also be used to make more conventionally-shaped nuts, i.e., from sheet form, or could also be used to provide thread substitutes in openings in pre-formed articles, etc.

What is claimed is:

1. The method of forming a device such as a box having in turn a nut integrally formed therein from a blank of workable sheet material comprising the steps of positioning said blank in a work holder of tooling having progressive work stations, forming a circular smooth bore opening through said blank, and thereafter inwardly reforming edge portions of said blank adjacent said opening into said opening so as to form a multiple number of discontinuous flats chordally extending across the inner periphery of said opening and entirely within the thickness of said opening, said flats meet to form a generally V-shaped running edge forming a tooth for engagement with the threads of a screw adapted to be received in said opening with the edge of said tooth extending up to but not exceeding one complete revolution within said opening and thereafter removing said blank from said tooling, and further including the steps of die cutting and scoring said blank and thereafter bending portions of said blank to assemble said device wherein said nut is an integral part thereof.

2. The method of claim 1, said flats being roughly adjacent each other, the discontinuous edges of said flats essentially forming a helical turn.

* * * * *